(12) United States Patent
Turley

(10) Patent No.: US 7,922,785 B2
(45) Date of Patent: Apr. 12, 2011

(54) BIODEGRADABLE POLYMERIC CONCENTRATE

(75) Inventor: Geoff Turley, The Barton (AU)

(73) Assignee: Biocentral Laboratories Limited, Adelaide (AU)

( * ) Notice: Subject to any disclaimer, the term of this patent is extended or adjusted under 35 U.S.C. 154(b) by 1059 days.

(21) Appl. No.: 11/629,545

(22) PCT Filed: Jun. 22, 2005

(86) PCT No.: PCT/AU2005/000894
§ 371 (c)(1),
(2), (4) Date: Dec. 12, 2006

(87) PCT Pub. No.: WO2005/122668
PCT Pub. Date: Dec. 29, 2005

(65) Prior Publication Data
US 2008/0066509 A1    Mar. 20, 2008

(30) Foreign Application Priority Data

Jun. 22, 2004  (AU) .............................. 2004903348

(51) Int. Cl.
C05D 9/00        (2006.01)
C05D 9/02        (2006.01)
(52) U.S. Cl. .......................... 71/27; 47/58.1 SC; 71/903
(58) Field of Classification Search ................. 71/903, 71/27; 526/307.2
See application file for complete search history.

(56) References Cited

U.S. PATENT DOCUMENTS

| | | | |
|---|---|---|---|
| 3,798,838 A | | 3/1974 | Hashimoto et al. |
| 4,579,578 A | * | 4/1986 | Cooke ................ 71/11 |
| 4,694,046 A | * | 9/1987 | Bock et al. ................ 525/329.4 |
| 5,120,344 A | * | 6/1992 | Libor et al. ................ 71/27 |
| 5,139,774 A | | 8/1992 | Meinard et al. |
| 5,387,056 A | * | 2/1995 | DeLuca ................ 405/128.45 |
| 5,405,425 A | * | 4/1995 | Pieh et al. ................ 71/27 |
| 5,604,168 A | * | 2/1997 | Libor ................ 516/103 |
| 5,772,723 A | * | 6/1998 | Robinett et al. ................ 71/27 |
| 5,779,396 A | * | 7/1998 | Mallon et al. ................ 405/264 |
| 6,360,478 B1 | | 3/2002 | Spittle |
| 6,395,051 B1 | * | 5/2002 | Arnold et al. ................ 71/27 |
| 6,669,752 B2 | * | 12/2003 | Arnold et al. ................ 71/27 |
| 6,889,471 B2 | * | 5/2005 | Arnold et al. ................ 47/58.1 SC |
| 2004/0132869 A1 | | 7/2004 | Peppmoller et al. |

FOREIGN PATENT DOCUMENTS

| | | | |
|---|---|---|---|
| DE | 2830528 | * | 4/1981 |
| EP | 0289338 | * | 11/1988 |
| WO | 8300498 A1 | | 2/1983 |
| WO | 9912869 A1 | | 3/1999 |
| WO | 03000621 A1 | | 1/2003 |

* cited by examiner

*Primary Examiner* — Wayne Langel
(74) *Attorney, Agent, or Firm* — The Webb Law Firm

(57) ABSTRACT

The invention concerns a composition which increases water retention and water absorption in a plant media, such as soil. In particular, the invention relates to a biodegradable polymeric water retention concentrate that when diluted and applied to various plant media improve water, fertilizer and nutrient retention in plant media with no root uptake or phytotoxic effects. The composition includes a polyacrylamide (PAM), a water softener, a surfactant and nutrients. The composition can be delivered to the plant media through existing irrigation systems and nutrient/fertilizer delivery systems, such as venturi, fertigator, separate mixing tank or any induction system.

22 Claims, No Drawings

BIODEGRADABLE POLYMERIC CONCENTRATE

FIELD OF THE INVENTION

The present invention relates to a water retention composition for treating plant media. In particular the invention relates to a biodegradable water retention polymeric concentrate.

BACKGROUND OF THE INVENTION

Water absorption and retention in the soil profile is a significant issue for those involved in the agricultural industry. Different soil types have varying water retention and absorption characteristics. In sandy soils water is usually able to easily penetrate the soil profile. However, the water quickly passes through the soil profile and out of the root zone of most agricultural plants. In irrigated areas this means that the frequency of irrigation must be increased. By contrast, clay soils have low water absorption rates but have significantly higher water retention. Low absorption rates in clay soils result in increased run-off which can intensify erosion. Other factors, such as hydrophobic or non-wetting soil properties also influence water behaviour. These soil characteristics can adversely affect the productivity of all types of plants used in agriculture including crops, pasture, trees and vines.

Various methods have been used to improve water absorption and water retention in soil profiles. Gypsum (Calcium Sulphate) is used to improve soil structure and increase water absorption. One of the main rationales for using gypsum is to reduce surface sealing and improve infiltration. The use of gypsum, however, leads to an increase in salinity which can threaten plant performance especially in soils with already high concentrations of salt, such as those soils found in Australia.

Surfactant or wetting agents are applied to plant growing media, such as soil, to improve water penetration and rewetting properties of the growing media. Hydrophilic surfactants prevent rapid drainage and improve water retention. Surfactants are also able to break down the hydrophobic build up around sand and soil particles, such as those found in non-wetting sands. However, surfactants may be affected by salts and other compounds found in the media. Furthermore, they may not be suitable for prolonged use when growing edible crops because of potential negative health effects. Tests have suggested that certain surfactants are acutely toxic to animals. Therefore, because of the potential risks the use of surfactants is cautioned, especially near sensitive environments such as waterways.

The application of chemicals to improve soil characteristics is undertaken in various ways. The chemicals, in a granular or powder form, can be simply spread across the soil surface or added during ploughing to minimise the loss due to run-off. In irrigated areas the chemicals are often sprinkled on the ground at an inlet prior to flood or furrow irrigation. Alternatively, a concentrated liquid emulsion can be added to a water body used as a source for irrigation water. However, these methods are quite imprecise which results in more chemicals being added to the agricultural environment than are actually necessary. This excessive use results in run-off and leached water from agricultural land having high concentration of chemicals which can adversely affect surrounding ecosystems.

The loss of water through evaporation and water infiltrating the ground prior to, or during, flood and trench irrigation means that these forms of irrigation are inefficient when used on vines and fruit trees. For these reasons various types of irrigations systems, such as drippers and micro-sprays, are used to increase the efficient use of water. However, the problem with these types of systems is that the granular preparations and emulsions cause blockages and therefore are not suitable for transporting the chemicals.

It is therefore an object of the present invention to provide a water additive that can be used in the agriculture, viticulture and horticulture industries that reduces the amount of water required when growing agricultural crops, trees and vines.

It is a further object of the present invention to provide a biodegradable water retention polymeric concentrate which is able to be transported through drip and spray irrigation systems including irrigation systems such as overhead centre pivot booms.

SUMMARY OF THE INVENTION

Therefore, according to a first aspect of the present invention there is proposed a water retention composition for treating plant media characterised by an acrylamide copolymer.

Preferably, said water retention composition includes a water softener, a surfactant and nutrients.

Preferably, the acrylamide copolymer is present in a range from 0.01 to 15% w/v in the composition, the water softener is in a range from 0.01 to 8% w/v in the composition, the nutrients are in a range from 0.01 to 2% w/v in the composition and the surfactant is in a range from 0.01 to 25% v/v in the composition.

Preferably, the water softener is sodium tripoly phosphate, the nutrients are chelated micronutrients, and the surfactant is sodium nonylphenol ethoxy sulphate.

Preferably, the acrylamide copolymer is anionic, with an anionicity between 13 and 30 mol %.

Preferably, the molecular weight of the acrylamide copolymer is between 11 and 16 million Daltons.

In a preferred form of the invention said water retention composition includes 0.05 to 3% w/v of an acrylamide copolymer, 0.02 to 1% w/v of nutrients, 0.03 to 5% w/v of a water softener and 0.05 to 15% v/v of a surfactant.

More preferably still said water retention composition has a pH of approximately 8.0, with 0.11% w/v of an anionic acrylamide copolymer, 0.017% w/v of nutrients, 0.1% v/v of sodium nonylphenol ethoxy sulphate and 0.05% w/v of sodium tripoly phosphate, a filler and suspension assister. All of the above concentrations are by volume (v/v) or weight (w/v).

Preferably, the composition includes a filler which is selected to act as a suspension assister for the composition. The filler is typically in a range of up to 99% in the composition and is preferably water.

Preferably, said water retention composition is a concentrate which can be diluted in a liquid. The concentrate is typically used in a ratio of 1:1000 by volume with water. For instance, 1 litre of polymeric water retention concentrate to 1000 litres of water.

In a further aspect of the invention there is proposed a method of preparing a water retention composition, including the steps of:

placing water in a mixing vessel, adding a water softener and mixing for approximately 10 minutes;

whilst mixing is still in progress adding nutrients and mixing for approximately a further 10 minutes;

whilst mixing is still in progress adding an acrylamide copolymer very slowly or using an eductor to wet up granules on entry to mixing vessel and mixing for approximately a further 45 minutes;

whilst mixing is still in progress adding a surfactant and mixing for approximately a further 15 minutes; and emptying finished product into a holding/filling tank and allowing to sit for 4-6 hours prior to packaging.

The mixing times may vary depending on quantities, but it is to be understood that all ingredients must be totally dissolved and mixed prior to packing.

Preferably, the mixing vessel should be a vat type with a low speed propeller type mixing attachment to prevent or minimise shearing of the polyacrylamide.

DESCRIPTION OF THE PREFERRED EMBODIMENT

The present invention relates to the use of a composition to increase water retention and water absorption in plant media, such as soil. More importantly the invention relates to a biodegradable water retention polymeric concentrate that when diluted and applied to various plant media improve water, fertilizer and nutrient retention in plant media with no root uptake or phyto-toxic effects.

In a preferred embodiment the composition includes a polyacrylamide (PAM), a water softener, a surfactant and a nutrient. The term polyacrylamide and shorthand acronym PAM are generic chemistry vocabulary referring to a broad class of compounds. The raw material acrylamide copolymer used in the composition of this invention have previously found applications in the clarification of beet, sugar cane juice and liquor, the scale control of sugar juice and liquor, the lye peeling of fruits and vegetables, adhesives, paper and paperboard for food contact, soil stabilization and water treatment industries. Also known as linear anionic copolymer of acrylamide and sodium acrylate they are water soluble, long chain molecules with a high molecular weight (10-20 million), an anionic charge density (10-40%) and very low toxicity (less than 0.05% w/w residual monomer).

Polyacrylamides have been used in agriculture for reducing irrigation-induced erosion. The soil stabilizing and flocculating properties of polyacrylamides have substantially improved runoff water quality by reducing sediments which may contain nitrogen, phosphorus, pesticides, weed seeds, and microorganisms. This reduction in sediment in run-off minimises the passage of nutrients and pesticides into the surrounding ecosystems. Furthermore, no adverse effects on soil microbial populations have been seen with the use of PAM. Polyacrylamides act to stabilize soil structure by enhancing particle cohesion, thus increasing resistance to shear-induced detachment and preventing transport in runoff.

The invention relates to a process of sustaining higher water retention and uniformity levels in plant media than untreated media or media treated with wetting agents alone. The invention utilises polyacrylamide polymers which are tolerant to salinity affected water, non-toxic to plants, have no adverse effect on soil microbial populations and are disperses easily in water. The polymers are effective at low percentages, easily release retained water and other common additives and help reduce leaching that occurs through plant media.

The biodegradable polymeric water retention concentrate which is an additive for water, is specifically formulated to use water more effective in the agricultural, viticulture and horticultural industries as well as domestic gardens and lawns, whilst not posing a threat to humans, animals or plants. The composition increases water retention in the root zone of plants thereby effectively reducing the amount of water applied to the plant media. Furthermore, polyacrylamides act to further laterally spread the water during infiltration.

It is envisaged that the acrylamide copolymer is present in a range from 0.01 to 15% w/v in the concentrate, the water softener is present in a range from 0.01 to 8% w/v, nutrients in a range from 0.01 to 2% w/v and the surfactant is present in a range from 0.01 to 25% v/v. The balance can be made up with a filler, such as water, which is typically in a range of up to 99%. The filler may be selected to act as a suspension assister for the polymeric water retention concentrate. It is to be understood that all of the concentrations are by volume (v/v) or weight (w/v).

The acrylamide copolymer is preferably anionic with a molecular weight between 11 and 16 million Daltons. Acrylamide copolymers with a lower molecular weight are better for use in clay soils, while acrylamide copolymers with larger molecular weights are better for use in sandy or sandy-loam soils. In this way the composition can be adapted for use in particular soil types. The skilled addressee should however appreciate that the invention is not limited to the use of an acrylamide copolymer with these molecular weights. The water softener is preferably sodium tripoly phosphate. The nutrients are preferably chelated micronutrients and the surfactant is preferably sodium nonylphenol ethoxy sulphate.

In an alternate embodiment the polymeric water retention composition is characterised by a acrylamide copolymer in a range of from 0.05 to 3% w/v, a water softener in a range of from 0.03 to 5% w/v, nutrients in a range of from 0.02 to 1% w/v and a surfactant in a range of from 0.05 to 15% v/v.

In a yet further alternate embodiment the polymeric water retention composition, with a pH of approximately 8.0, is characterised by an anionic acrylamide copolymer of about 0.11% w/v, sodium nonylphenol ethoxy sulphate of about 0.1% v/v, nutrients of about 0.017% w/v, sodium tripoly phosphate of about 0.05% w/v, a filler and a suspension assister.

Although surfactant are included as part of the composition it should be appreciated by the reader that the present invention relates to a water retention agent and not simply a wetting agent.

This then generally describes the invention but to assist with further understanding below is a reference to a particular example and a method of mixing the concentrate which has been found to be efficacious. It should be noted that the resultant product is for all intents and purposes the formulation which performs as described above.

The following ingredients were prepared:

| | |
|---|---|
| Anionic acrylamide copolymer | 135 grams |
| Sodium tripoly phosphate | 50 grams |
| Sodium nonylphenol ethoxy sulphate | 100 milliliters |
| Chelated micronutrients | 20 grams |
| Water | 120 liters |

The ingredients were prepared in the following order.

1. placing water in a mixing vessel, adding sodium tripoly phosphate and mixing for approximately 10 minutes.

2. whilst mixing is still in progress adding nutrients and mixing for approximately 10 minutes.

3. whilst mixer is still in progress adding anionic acrylamide copolymer very slowly or use eductor to wet up granules on entry to mixer and mixing for approximately 45 minutes.

4. whilst mixer is still in progress adding sodium nonylphenol ethoxy sulphate and mixing for approximately 15 minutes.

5. emptying finished product into holding/filling tank and allowing to sit for 4-6 hours prior to packaging.

Step 5 is important as it takes this period for the polyacrylamide to totally dissolve and form its structure. The mixing vessel should be a vat type with low speed propeller type mixing attachment to prevent or minimise shearing of the polyacrylamide. It should be appreciated that the mixing times may vary depending on quantities, but it is to be understood that all ingredients must be totally dissolved and mixed prior to packing.

By this means a polymeric water retention concentrate is formed which can be packed in plastic drums or similar containers. The anionic acrylamide copolymer used in the invention is organic so organic formulations can be formulated by removing the sodium tripoly phosphate, replacing the surfactant mentioned with an organic surfactant and replacing the chelated micronutrients with organic fertilizers and nutrients by which means an organic polymeric water retention concentrate is formed.

The concentrate of the present invention can be used in a ratio of 1:1000 litres of water, alternatively the concentrate may be used in concentrations of 1:1 to 1:2000. The above ingredients can also be blended in a dry formulation by replacing the water content with bentonite, anionic acrylamide copolymer, nutrients and powdered surfactant (optional) for utilisation in mulches, potting mixes and similar or by broadcast onto the growing media.

It is also possible to custom formulate the invention to site specific needs of nutrients depending on soil type and deficiencies or crop type needs. For instance, where a soil is deficit in a trace element or a particular nutrient, these can be added to the composition whilst it is being prepared.

As an alternative to the liquid formulation it is also possible to formulate the composition of the invention as a powder to be added directly to soils.

The efficiency of the composition of the present invention to retain water within soil profiles has been demonstrated by various trials. One of the trials undertaken in conjunction with the Urrbrae TAFE Horticultural College in Adelaide, South Australia, tested the water retention performance characteristics of various growing media. The trials were conducted over 5 day periods with ten growing media being tested under normal growing conditions in a greenhouse environment. A treatment and a control of each of the growing media were placed into 125 mm pots. Each of the treatment pots had the composition of the present invention added, as a powder and all pots then had 500 mls of water applied to the media. At the end of the trial the water content of each of the treatments and controls were measured. Four trials were undertaken with the average water retention illustrated in Table 1.

TABLE 1

Average water retained over the trial periods.

| Medium | Water Retained (ml) | |
| --- | --- | --- |
| | Treatments (contain composition) | Control |
| Perlite | 325 | 85 |
| Granulated Growool | 400 | 100 |
| Gravel | 105 | 1 |
| Pumice | 200 | 25 |
| Growool | 250 | 20 |
| Coconut coir | 325 | 185 |
| Vermiculite | 400 | 100 |
| Expanded clay | 105 | 10 |
| Absorba stone | 250 | 25 |
| 60/40 Expanded clay & coconut | 260 | 100 |

The trial provided strong evidence of increased water retention for all treatment media containing the composition of the present invention. The average retention rate for the treatments was 50.40% compared with 13.02% for the controls. Over all the media used in the trials the use of the composition of the present invention increased water retention by an average of 287%. It has been estimated that if water retention in the root zones of agricultural plants was increased as little as 10% in a 1 m profile, the available water saved would be equivalent to nearly a full day's evapo-transpiration.

The method of introduction of the composition of the present invention to plant media is through commonly used irrigation systems and nutrient/fertilizer delivery systems, such as venturi, fertigator, separate mixing tank or induction systems. The present invention overcomes the blockage problems previously encountered when using powder or emulsion of polyacrylamides. The composition in accordance with the invention is able to disperse and mix immediately in water flow, whether low or high. Because induction or delivery systems commonly used by sprinkler and drip irrigators can be used as a vehicle for delivering the composition the user does not need to purchased new equipment or modified existing equipment. It has also been observed that by using the composition of the present invention irrigation drip lines run cleaner and without the need for periodic acid-treatment to flush out scale.

A further trial was conducted using both a liquid formulation, manufactured as previously described and also a powder formulation to determine moisture retention on premium potting mix. The trial was conducted in a controlled greenhouse environment coupled with temperature and humidity controllers.

TDS (total dissolved solids) and pH results were gathered using Pro-check digital meters as well as hand-held Eutech cybernetic digital meters to cross-reference readings. Moisture readings were conducted utilising Rapitest analogue Mini Moisture meter. The cultivar used for this trial was Marigolds.

The trial was conducted for 5 weeks from planting. In all 10 pots were used in the trial with 10 variation of growing media, added nutrients and inclusion of the composition of the invention, either as a powder or as a liquid. In each case the water added was pH 7 with a TDS of 400-500 ppm. Mixed nutrients were added at pH 6.5 with a TDS of 1350-1450 ppm.

The identity of the pots used were as shown in Table 2, below

TABLE 2

Test Pot identities

| Pot No. | |
| --- | --- |
| 1 | Peats Potting Mix (only) |
| 2 | Peats Potting Mix/Aquaboost Powder |
| 3 | Peats Potting Mix/Aquaboost Powder + Nutrients |
| 4 | Peats Potting Mix + Nutrients |
| 5 | Peats Potting Mix/Aquaboost Liquid |
| 6 | Peats Potting Mix/Aquaboost Liquid + Nutrients |
| 7 | Sand |
| 8 | Sand/Loam 50/50 |
| 9 | Sand + Aquaboost Powder |
| 10 | Sand/Loam + Aquaboost Powder |

The results of the tests, starting with a first test date of Feb. 23, 2004 is shown in tables

TABLE 3

TEST DATE: 23 Feb. 2004

| Pot No. | Initial Moisture Reading | 2nd Moisture Reading | Water PH | ppm TDS | Reclaimed Water mls |
|---|---|---|---|---|---|
| 1 | 0 | 2 | 6.8 | 1350 | 690 |
| 2 | 0 | 3 | 6.6 | 1570 | 600 |
| 3 | 0 | 4 | 6.4 | 1890 | 530 |
| 4 | 0 | 3 | 6.4 | 1860 | 660 |
| 5 | 0 | 3 | 6.8 | 1150 | 760 |
| 6 | 0 | 4 | 6.3 | >1999 | 610 |
| 7 | 0 | 4 | 6.7 | 1580 | 370 |
| 8 | 0 | 4 | 6.6 | >1999 | 280 |
| 9 | 0 | 4 | 6.7 | >1999 | 190 |
| 10 | 0 | 4 | 6.4 | >1999 | 160 |

TABLE 4

TEST DATE: 26 Feb. 2004

| Pot No. | Initial Moisture Reading | 2nd Moisture Reading | Water PH | ppm TDS | Reclaimed Water mls |
|---|---|---|---|---|---|
| 1 | 0 | 3 | 6.1 | 900 | 630 |
| 2 | 1 | 4 | 6.6 | 810 | 710 |
| 3 | 1 | 4 | 6.7 | 1650 | 600 |
| 4 | 1 | 3 | 6.6 | 1700 | 660 |
| 5 | 1 | 3 | 6.6 | 1040 | 670 |
| 6 | 2 | 4 | 6.5 | >1999 | 630 |
| 7 | 2 | 4 | 6.4 | 840 | 600 |
| 8 | 3 | 4 | 6.4 | 700 | 690 |
| 9 | 4 | 4 | 7 | 700 | 800 |
| 10 | 4 | 4 | 7.4 | 640 | 700 |

TABLE 5

TEST DATE: 01 Mar. 2004

| Pot No. | Initial Moisture Reading | 2nd Moisture Reading | Water PH | ppm TDS | Reclaimed Water mls |
|---|---|---|---|---|---|
| 1 |  | 2 | 7.4 | 750 | 780 |
| 2 | 2 | 4 | 7.4 | 790 | 645 |
| 3 | 2 | 4 | 6.6 | 1680 | 675 |
| 4 | 1 | 3 | 6.5 | 1650 | 800 |
| 5 | 1 | 4 | 7.4 | 720 | 660 |
| 6 | 1 | 4 | 6.5 | >1999 | 790 |
| 7 | 1 | 3 | 7.6 | 650 | 700 |
| 8 | 2 | 4 | 7.6 | 530 | 620 |
| 9 | 3 | 4 | 7.6 | 610 | 750 |
| 10 | 3 | 4 | 7.1 | 650 | 710 |

TABLE 6

TEST DATE: 04 Mar. 2004

| Pot No. | Initial Moisture Reading | 2nd Moisture Reading | Water PH | ppm TDS | Reclaimed Water mls |
|---|---|---|---|---|---|
| 1 | n/r | 2 | 7.1 | 670 | 760 |
| 2 | n/r | 3 | 7.2 | 720 | 660 |
| 3 | n/r | 3 | 6.5 | 1690 | 585 |
| 4 | n/r | 3 | 6.4 | 1710 | 700 |
| 5 | 1 | 3 | 7.1 | 690 | 640 |
| 6 | n/r | 4 | 6.4 | 1900 | 600 |
| 7 | 1 | 4 | 6.9 | 770 | 545 |
| 8 | 2 | 4 | 6.9 | 850 | 500 |
| 9 | 1 | 4 | 7.4 | 710 | 515 |
| 10 | 2 | 4 | 7.4 | 630 | 580 |

TABLE 7

TEST DATE: 08 Mar. 2004

| Pot No. | Initial Moisture Reading | 2nd Moisture Reading | Water PH | ppm TDS | Reclaimed Water mls |
|---|---|---|---|---|---|
| 1 | n/r | 2 | 7.1 | 530 | 640 |
| 2 | n/r | 3 | 7.4 | 560 | 580 |
| 3 | n/r | 4 | 6.7 | 1660 | 580 |
| 4 | n/r | 3 | 6.7 | 1630 | 680 |
| 5 | n/r | 3 | 7.4 | 530 | 630 |
| 6 | 1 | 4 | 6.8 | 1750 | 650 |
| 7 | 1 | 4 | 7.2 | 560 | 495 |
| 8 | 1 | 4 | 7.4 | 490 | 500 |
| 9 | 1 | 4 | 7.4 | 510 | 500 |
| 10 | 2 | 4 | 7.6 | 510 | 520 |

TABLE 8

TEST DATE: 11 Mar. 2004

| Pot No. | Initial Moisture Reading | 2nd Moisture Reading | Water PH | ppm TDS | Reclaimed Water mls |
|---|---|---|---|---|---|
| 1 | n/r | 2 | 7.5 | 530 | 740 |
| 2 | 1 | 3 | 7.5 | 580 | 640 |
| 3 | 1 | 4 | 6.6 | 1640 | 600 |
| 4 | n/r | 3 | 6.6 | 1620 | 720 |
| 5 | n/r | 3 | 7.6 | 540 | 660 |
| 6 | 1 | 4 | 6.5 | 1720 | 690 |
| 7 | 2 | 4 | 7.7 | 460 | 760 |
| 8 | 3 | 4 | 7.7 | 470 | 840 |
| 9 | 3 | 4 | 7.6 | 430 | 700 |
| 10 | 3 | 4 | 7.7 | 460 | 700 |

TABLE 9

TEST DATE: 15 Mar. 2004

| Pot No. | Initial Moisture Reading | 2nd Moisture Reading | Water PH | ppm TDS | Reclaimed Water mls |
|---|---|---|---|---|---|
| 1 | n/r | 2 | 7.3 | 550 | 700 |
| 2 | 1 | 4 | 7.4 | 590 | 640 |
| 3 | 1 | 3 | 6.5 | 1770 | 600 |
| 4 | n/r | 4 | 6.5 | 1760 | 650 |
| 5 | n/r | 3 | 7.4 | 550 | 640 |
| 6 | 1 | 4 | 6.5 | 1800 | 680 |
| 7 | 2 | 4 | 7.6 | 430 | 740 |
| 8 | 1 | 4 | 7.6 | 440 | 780 |
| 9 | 2 | 4+ | 7.6 | 430 | 600 |
| 10 | 2 | 4+ | 7.5 | 450 | 600 |

TABLE 10

TEST DATE: 18 Mar. 2004

| Pot No. | Initial Moisture Reading | 2nd Moisture Reading | Water PH | ppm TDS | Reclaimed Water mls |
|---|---|---|---|---|---|
| 1 | n/r | 1 | 7.1 | 510 | 740 |
| 2 | 1 | 2 | 7.1 | 550 | 660 |
| 3 | 1 | 1 | 6.5 | 1440 | 670 |
| 4 | n/r | 3 | 6.5 | 1400 | 700 |
| 5 | n/r | 4 | 7.2 | 520 | 680 |
| 6 | n/r | 4 | 6.4 | 1470 | 700 |
| 7 | 1 | 4 | 7.3 | 440 | 800 |
| 8 | n/r | 3 | 7.3 | 440 | 820 |
| 9 | 2 | 4 | 7.3 | 430 | 720 |
| 10 | 1 | 4 | 7.3 | 440 | 720 |

TABLE 11

TEST DATE: 22 Mar. 2004

| Pot No. | Initial Moisture Reading | 2nd Moisture Reading | Water PH | ppm TDS | Reclaimed Water mls |
|---|---|---|---|---|---|
| 1 | n/r | 2 | 7 | 500 | 740 |
| 2 | 1 | 4 | 7.1 | 570 | 660 |
| 3 | 1n/r | 4 | 6.4 | 1490 | 680 |
| 4 | n/r | 3 | 6.3 | 1450 | 720 |
| 5 | 1 | 4 | 6.9 | 550 | 660 |
| 6 | 1 | 4+ | 6.2 | 1530 | 700 |
| 7 | n/r | 4 | 6.9 | 480 | 780 |
| 8 | n/r | 2 | 7.1 | 450 | 820 |
| 9 | 1 | 4+ | 7.1 | 450 | 640 |
| 10 | 1 | 4+ | 7.2 | 450 | 700 |

TABLE 12

TEST DATE: 26 Mar. 2004

| Pot No. | Initial Moisture Reading | 2nd Moisture Reading | Water PH | ppm TDS | Reclaimed Water mls |
|---|---|---|---|---|---|
| 1 | n/r | 2 | 6.9 | 500 | 760 |
| 2 | 1 | 4 | 7.1 | 540 | 640 |
| 3 | nr | 4 | 6.5 | 1190 | 650 |
| 4 | n/r | 3 | 6.4 | 1180 | 730 |
| 5 | 1 | 4 | 6.9 | 530 | 620 |
| 6 | n/r | 4 | 6.4 | 1230 | 700 |
| 7 | n/r | 2 | 7 | 460 | 780 |
| 8 | n/r | 4 | 7.2 | 440 | 800 |
| 9 | 1 | 4+ | 7.2 | 450 | 660 |
| 10 | 1 | 4+ | 7.3 | 450 | 700 |

TABLE 13

TEST DATE: 30 Mar. 2004

| Pot No. | Initial Moisture Reading | 2nd Moisture Reading | Water PH | ppm TDS | Reclaimed Water mls |
|---|---|---|---|---|---|
| 1 | 1 | 2 | 6.9 | 510 | 740 |
| 2 | 2 | 4 | 7.1 | 550 | 660 |
| 3 | 1 | 4+ | 6.5 | 1080 | 660 |
| 4 | n/r | 3 | 6.5 | 1040 | 720 |
| 5 | 1 | 4 | 7.1 | 540 | 660 |
| 6 | 1 | 4 | 6.5 | 1110 | 700 |
| 7 | 1 | 3 | 7 | 460 | 780 |
| 8 | 1 | 3 | 6.9 | 460 | 800 |
| 9 | 2 | 4+ | 7.1 | 460 | 620 |
| 10 | n/r | 4 | 7.1 | 470 | 700 |

TABLE 14

TEST DATE: 1 Apr. 2004

| Pot No. | Initial Moisture Reading | 2nd Moisture Reading | Water PH | ppm TDS | Reclaimed Water mls |
|---|---|---|---|---|---|
| 1 | 2 | 3 | 7 | 600 | 820 |
| 2 | 4 | 4+ | 7.1 | 640 | 760 |
| 3 | 3 | 4+ | 6.6 | 1250 | 680 |
| 4 | 1 | 3 | 6.5 | 1170 | 720 |
| 5 | 2 | 4 | 7 | 640 | 760 |
| 6 | 2 | 4 | 6.5 | 1450 | 740 |
| 7 | 3 | 4 | 7 | 460 | 840 |
| 8 | 1 | 3 | 7.2 | 430 | 860 |
| 9 | 4 | 4+ | 7.4 | 440 | 780 |
| 10 | 3 | 4+ | 7.4 | 440 | 800 |

A visual comparison was also used to determine plant growth and from the trials it was apparent that plant growth was significantly greater and healthier in those pots to which the composition of the invention has been added. This was evidenced by more flower numbers, greater branching and greater height.

Taking into account that moisture readings were at medium levels when re-watered, the tests indicate that it is reasonable to assume that to achieve medium moisture levels, when using the composition of the invention, in excess of 30% less water would be required.

With the introduction of stricter controls on water usage the composition of the present invention has significant advantages. The ability to crop using less water and less nutrients whilst increase or maintaining yields and quality, has distinct advantages over currently available chemicals. In the growing season of a crop this invention will greatly reduce the amount of water normally required, thereby reducing pumping costs, energy and leaching losses of nutrients and chemicals to groundwater.

The skilled addressee will now appreciate the advantages of the present invention. The composition reduces water and nutrient stress, because water remains in the root zone for a longer period of time. This slower water and nutrient "pass-through" time results in better water and nutrient absorption by the plants. The increased fertilizer and nutrient efficiency and reduced drought stress results in healthier crops and assists in seed germination. The composition has the unique characteristics of being able to increase the wetting pattern (area) whilst retaining water in the growing media for longer than water alone thus reducing irrigation durations and water application amounts. The composition improves the lateral movement of water and helps preserve the micro structure of soil, thus assisting infiltration. Furthermore, because less leaching occurs less water and nutrients will be required.

Further advantages and improvements may very well be made to the present invention without deviating from its scope. Although the invention has been shown and described in what is conceived to be the most practical and preferred embodiment, it is recognized that departures may be made therefrom within the scope and spirit of the invention, which is not to be limited to the details disclosed herein but is to be accorded the full scope of the claims so as to embrace any and all equivalent devices and apparatus.

In any claims that follow and in the summary of the invention, except where the context requires otherwise due to express language or necessary implication, the word "comprising" is used in the sense of "including", i.e. the features specified may be associated with further features in various embodiments of the invention.

The invention claimed is:

1. A water retention composition for treating plant media comprising a linear acrylamide copolymer of acrylamide, sodium acrylate, a water softener, a surfactant and nutrients.

2. A water retention composition as in claim 1, wherein the acrylamide copolymer is present in a range from 0.01 to 15% w/v in the composition.

3. A water retention composition as in claim 1, wherein the water softener is in a range from 0.01 to 8% w/v in the composition.

4. A water retention composition as in claim 1, wherein the nutrients are in a range from 0.01 to 2% w/v in the composition.

5. A water retention composition as in claim 1, wherein the surfactant is in a range from 0.01 to 25% w/v in the composition.

6. A water retention composition as in claim 1, wherein the acrylamide copolymer is anionic.

7. A water retention composition as in claim 1, wherein the anionicity of the acrylamide copolymer is between 13 and 30 mol %.

8. A water retention composition as in claim 1, wherein the molecular weight of the acrylamide copolymer is between 11 and 16 million Daltons.

9. A water retention composition as in claim 1, wherein the water softener is sodium tripoly phosphate.

10. A water retention composition as in claim 1, wherein the nutrients are chelated micronutrients.

11. A water retention composition as in claim 1, wherein the surfactant is sodium nonylphenol ethoxy sulphate.

12. A water retention composition for treating plant media comprising: 0.05 to 3% w/v of a linear acrylamide copolymer of acrylamide and sodium acrylate; 0.02 to 1% w/v of nutrients; 0.03 to 5% w/v of a water softener; and 0.05 to 15% w/v of a surfactant.

13. A water retention composition for treating plant media, having a pH of 8.0, comprising: 0.11% w/v of an anionic a linear acrylamide copolymer of acrylamide and sodium acrylate; 0.017% w/v of nutrients; 0.1% w/v of sodium nonylphenol ethoxy sulphate; and 0.05% w/v of sodium tripoly phosphate.

14. A water retention composition as in claim 13, wherein the composition further comprises a filler.

15. A water retention composition as in claim 14, wherein the filler is selected to act as a suspension assister for the composition.

16. A water retention composition as in claim 14, wherein the filler is in a range of up to 99% in the composition.

17. A water retention composition as in claim 14, wherein the filler is water.

18. A water retention composition as in claim 1, wherein said water retention composition is a concentrate which can be diluted in a liquid.

19. A water retention composition as in claim 18, wherein the concentrate is used in a ratio of 1:1000 by volume with water.

20. A method of preparing a water retention composition for treating plant media, comprising the steps of:
    placing water in a mixing vessel, adding a water softener and mixing for approximately 10 minutes;
    whilst mixing is still in progress adding nutrients and mixing for approximately a further 10 minutes;
    whilst mixing is still in progress adding a linear acrylamide copolymer of acrylamide and sodium acrylate to the mixing vessel and mixing for approximately a further 45 minutes;
    whilst mixing is still in progress adding a surfactant and mixing for approximately a further 15 minutes;
    emptying finished product into a holding/filling tank wherein said finished product is allowed to sit for 4-6 hours prior to packaging; and
    packaging the finished product.

21. A method of preparing a water retention composition as in claim 20, wherein the mixing vessel is a vat type mixing vessel with propeller mixing attachment to prevent or minimize shearing of the polyacrylamide.

22. The method of preparing a water retention composition as in claim 20, wherein the linear acrylamide copolymer of acrylamide and sodium acrylate is added to the mixing vessel with an eductor to wet up granules on entry.

* * * * *